United States Patent [19]

Stark

[11] 4,209,209
[45] Jun. 24, 1980

[54] FABRICATED ENGINE MAIN BEARING CAPS

[75] Inventor: Terrence L. Stark, Royal Oak, Mich.

[73] Assignee: General Motors Corporation, Detroit, Mich.

[21] Appl. No.: 935,175

[22] Filed: Aug. 21, 1978

[51] Int. Cl.² ............................................... F16C 9/02
[52] U.S. Cl. ................................. 308/23; 123/195 S
[58] Field of Search .............. 29/149.5 C; 123/195 S; 308/15, 23, 74, 167, 179, 245

[56] References Cited

U.S. PATENT DOCUMENTS

| | | | |
|---|---|---|---|
| 2,129,906 | 9/1938 | Brill | 123/195 R |
| 2,341,488 | 2/1944 | Taylor | 123/195 S |
| 2,997,347 | 8/1961 | Bauer | 308/23 |

*Primary Examiner*—Frederick R. Schmidt
*Attorney, Agent, or Firm*—Robert J. Outland

[57] ABSTRACT

Constructions for fabricated sheet metal engine main bearing caps are disclosed having certain common features including provision of a bearing flange member formed from a single sheet and a supporting base member which is fabricated from at least one formed metal sheet, with in an alternative embodiment the addition of separate pieces, to define spaced columns connected by dual webs and an end plate comprising a strong relatively light structure.

5 Claims, 6 Drawing Figures

U.S. Patent Jun. 24, 1980 Sheet 1 of 2 4,209,209
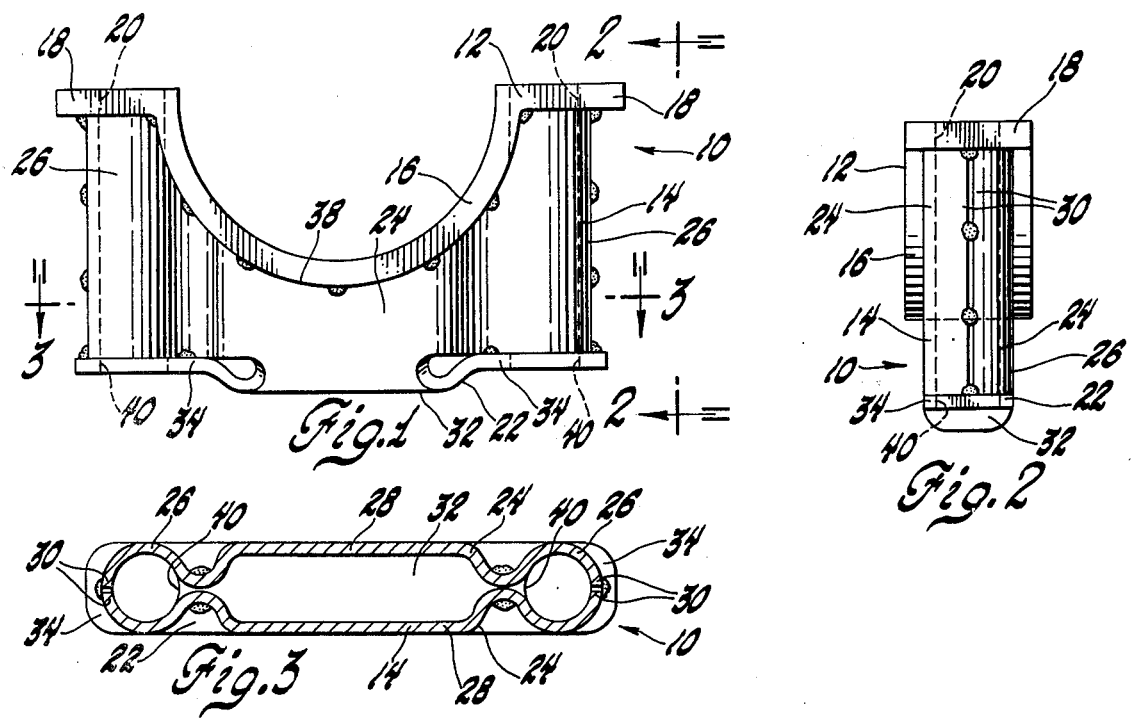
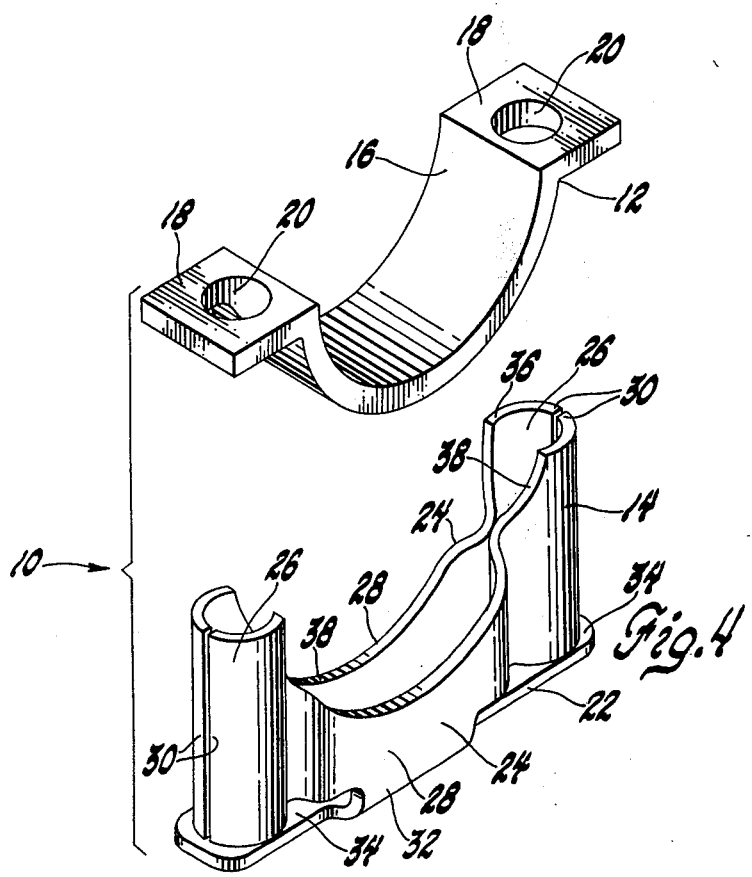

FABRICATED ENGINE MAIN BEARING CAPS

Technical Field

This invention relates to crankshaft supporting main bearing caps especially, though not exclusively, adapted for use on automotive type internal combustion engines. More particularly, the invention discloses alternative constructions of fabricated sheet metal bearing caps of strong, lightweight construction.

Background

The common method of supporting an internal combustion engine crankshaft in the crankcase is through provision of a plurality of removable main bearing caps secured to the engine block or frame and having semicircular recesses which cooperate with mating recesses in the block to support directly, or through removable bearing inserts, the spaced journals of the crankshaft. Historically, many forms of bearing cap constructions have been proposed but for reasons of strength, cost and ease of mass production, most bearing caps have been formed by the methods of casting or forging iron or steel materials. These constructions have been completely satisfactory in all major respects.

Nevertheless, a desire to reduce the overall weight of engines used, particularly, in motor vehicle applications lead to the conception and investigation of possible alternative bearing cap designs to find practical embodiments capable of reducing overall weight without substantially sacrificing the requirements of strength and cost. This work led to the development of several proposed fabricated sheet metal bearing cap designs in accordance with principles of the present invention.

The concept of designing weight saving fabricated structures as substitutes for castings is, of course, well known. U.S. Pat. No. 2,129,906 Brill shows an example of an internal combustion engine crankcase fabricated by welding steel plates and forgings together into an integrated assembly. This manner of construction has been extensively used in medium speed diesel engines for railroad and marine service. Another construction, shown in U.S. Pat. No. 2,341,488 Taylor, involves the fabrication of extensive portions of an internal combustion engine from sheet steel stampings. This construction includes a fabricated sheet metal crankcase lower section which combines the functions of both main bearing caps and oil pan of the usual engine.

While these prior art constructions are of interest in suggesting the weight reducing value of fabricated over cast construction, they do not provide or teach the manner in which suitable fabricated main bearing caps may be made meeting the desired criteria and suitable for use in automotive type vehicle engines.

Summary of the Invention

The present invention provides design concepts as well as two particular main bearing cap constructions which are capable of providing substantially reduced weight with adequate strength and low cost, as compared to conventional cast main bearing caps for which they may be substituted. Both of the designs include the basic components of a crankshaft supporting recessed bearing flange of relatively heavy construction and a supporting base including tube-like columns, dual spaced connecting webs and an end plate secured in supporting engagement with the bearing flange and formed, at least in part, from relatively lighter sheet metal material. Additional diverse features of the designs are also included.

These and other features and advantages of the invention will be more fully understood from the following description of certain embodiments chosen for purposes of illustration, taken together with the accompanying drawings.

Brief Drawing Description

In the drawings:

FIG. 1 is a face view of a preferred two-piece embodiment of fabricated bearing cap formed according to the invention;

FIG. 2 is a side view in the direction of the arrows from the plane indicated by the line 2—2 of FIG. 1;

FIG. 3 is a cross-sectional view downwardly in the direction of the arrows from the plane indicated by the line 3—3 of FIG. 1; and FIG. 4 is an exploded pictorial view illustrating the elements of the bearing cap of FIGS. 1-3;

Figure 5:
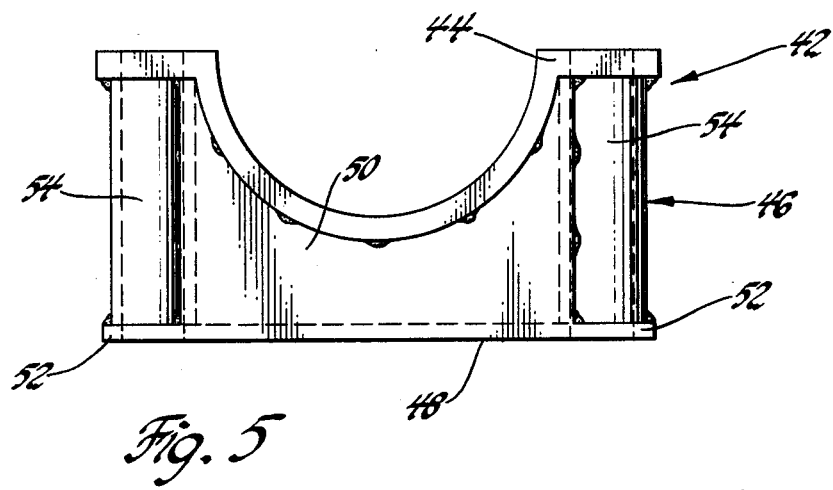
FIG. 5 is a face view like FIG. 1, but showing an alternative four-piece embodiment of fabricated bearing cap formed according to the invention.

Best Mode for Carrying Out the Invention

Referring now to the drawings in detail, FIGS. 1-4 illustrate the presently preferred embodiment of fabricated bearing cap formed in accordance with the principles of the invention. This embodiment comprises a two-piece construction wherein the bearing flange and supporting base are each constructed from a single piece of formed sheet steel. As illustrated, the bearing cap, generally indicated by numeral 10, consists of a bearing flange 12 and supporting base 14 welded together into a single unit.

The bearing flange member 12 comprises a single formed sheet steel member having a semi-circular central portion 16 and a pair of flattened ears 18 extending laterally oppositely from the central portion. Openings 20 are provided in the ears 18 for purposes to be subsequently described.

The supporting base member 14 is formed from a single sheet to provide a centrally disposed end plate 22 and a pair of upstanding wall portions 24 formed to define opposing halves of a pair of laterally spaced tube-like column portions 26 laterally interconnected by spaced dual webs 28. Each of the webs 28 and the connected halves of the column portions 26 are formed from a single one of the wall portions 24, the portions being welded or otherwise secured together along the opposing ends 30 of the wall portions at the outer edges of the column portions 26.

The end plate 22 includes a depressed central portion 32 formed integral with the wall portions 24 and with laterally extending upwardly displaced end portions 34 which engage the bottom of the respective column portions 26 and are secured thereto by welding or the like to provide a strong supporting base construction.

The upper edge 36 of the supporting base includes semi-circular recesses 38 in the connecting webs centered between the column portions and opposite the end plate. These recesses and the adjacent unrecessed portions of the base upper edge provide a seat for the bearing flange member 12 including its semi-circular central portion and laterally extending ears. These portions are welded securely to the supporting base, webs and column portions to provide a solid assembly capable of accepting the structural loads required of an engine bearing cap. Openings 40 are provided in the end portions 34 of the bottom plate in alignment with the interiors of the column portions 26 and the openings 20 in the ears of the bearing flange to provide for the insertion of retaining bolts or studs, not shown, to secure the bearing cap in place on an associated engine in conventional fashion.

Figure 6:
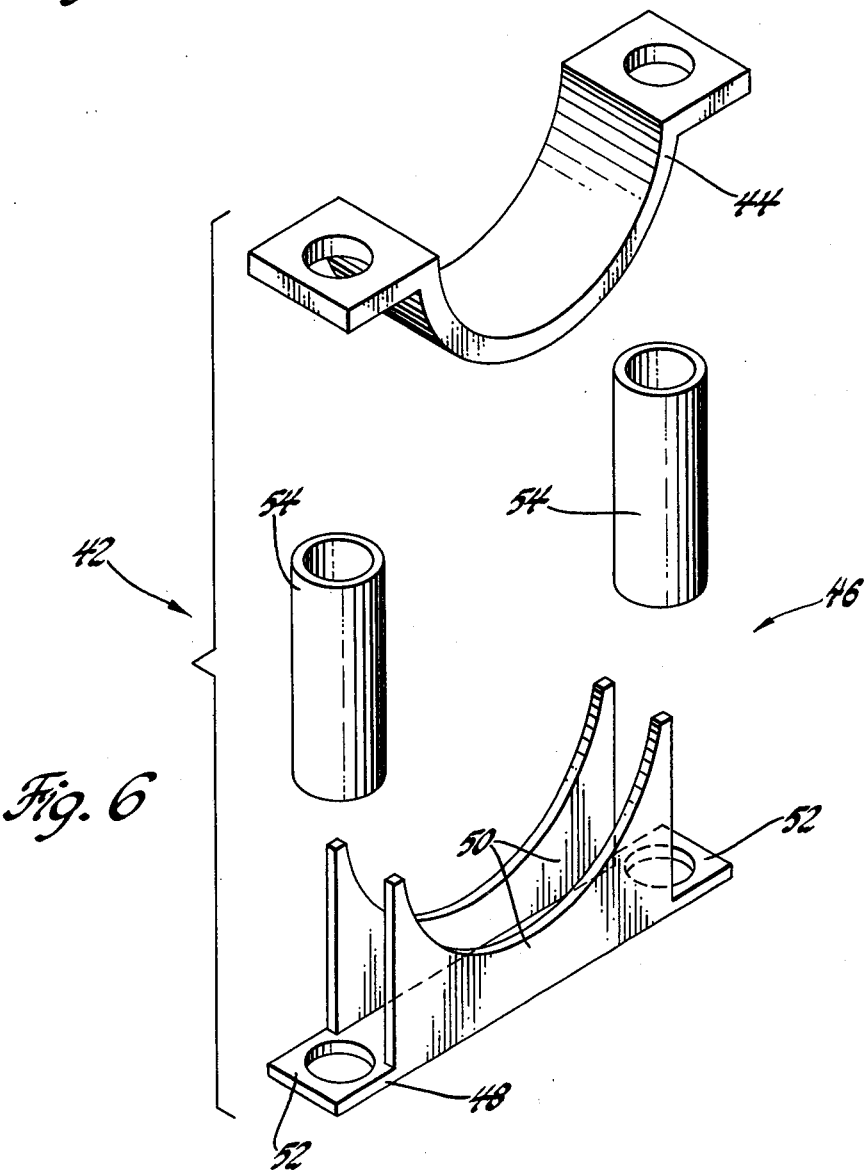
FIG. 6 is an exploded pictorial view illustrating the elements of the bearing cap of FIG. 5.

FIGS. 5 and 6 illustrate an alternative embodiment of fabricated bearing cap having certain construction features similar to the embodiment just described. The bearing cap 42 of the first alternative embodiment is fabricated of four pieces including a bearing flange 44 which may be identical to the bearing flange of the first described embodiment, and a supporting base 46 constructed in this case of three separate members.

Base 46 includes a formed flat sheet metal member comprising a central end plate 48 having upwardly extending opposed dual web portions 50 integrally formed with the edges of the end plate. End portions 52 of the end plate extend laterally outward of the webs 50 and support separate tubular column members 54 which are welded or otherwise secured to the webs and end portions to form the complete supporting base. In this base the bearing flange 44 is received and secured by welding in a manner similar to that of the first described embodiment to form the completed bearing cap.

The actual strength and weight of the bearing cap units constructed in accordance with the above described designs will, of course, depend on numerous variables determined by the availability of materials of suitable strength and formability as well as the dimensional and strength requirements of the part. In general, however, it is considered preferable that the bearing flange portion of the bearing cap construction be made from a relatively thicker sheet of low strength leaded steel, while the supporting base members may desirably be formed from a somewhat thinner sheet of higher strength formable steel selected to provide a balance between the required structural strength and the desired lightness of overall weight. The box-like constuction resulting from the provision of spaced dual web members adds to the structural rigidity of both designs, while allowing the use of lighter weight sheet in the base member.

While two embodiments of the invention have been specifically disclosed to demonstrate their individual features as well as the overall principles of the invention, it is apparent that the inventive principles may be applied to create other suitable embodiments in addition to those disclosed herein. Accordingly, it is desired that the invention not be limited to only the disclosed embodiments, but have the full scope permitted by the language of the following claims.

The embodiments of the invention in which an exclusive property or privilege is claimed are defined as follows:

1. A fabricated bearing cap comprising a bearing flange and a supporting base,
   said base including a pair of laterally spaced tube-like column portions interconnected laterally along most of their length by spaced dual webs, and an end plate engaging one end of each of the column portions and also connecting said webs, said webs having semi-circular recesses at their edges opposite the end plate and centered between the column portions, and
   said bearing flange comprising a single formed sheet metal member having a semi-circular central portion received near its opposite edges in said web recesses and a pair of flattened ears extending laterally oppositely from the central portion and seated on the ends of the column portions opposite from the end plate,
   said bearing flange and said supporting base being secured together in a unitary assembly,
   said end plate and said bearing flange ears having openings aligned with the interior of the tube-like column portions to receive bolt-like securing means engagable with said end plate for securing said flange ears against a mating bearing support.

2. The combination of claim 1 wherein said end plate and said web portions comprise a single sheet metal blank formed into a U-shape with the web portions forming the sides of the U.

3. The combination of claim 2 wherein said column portions comprise separate tube members fixed in said unitary assembly.

4. The combination of claim 2 wherein said column portions are a part of said single sheet metal blank and comprise arcuately shaped extensions of said web portions.

5. A two-piece fabricated bearing cap comprising
   a bearing flange formed from a single piece of sheet metal and having a semi-circular central portion with a pair of flattened ears extending laterally outward from opposite ends of said central portion, and
   a supporting base formed from a single piece of sheet metal and having a centrally disposed end plate portion with opposed wall portions extending up in spaced generally parallel relation from opposite edges of said end plate portion, said wall portions each having a central web portion generally aligned with its respective end plate edge but turned inwardly toward the opposing web portion near its ends, and part cylindrical half-column portions formed one on each of the turned in ends of the web portions with opposing half-column portions secured together to form supporting hollow column portions joined by spaced dual web portions,
   said web and column portions being centrally recessed at their edges opposite said end plate portion and receiving therein the semi-circular central portion of said bearing flange member, with said flattened ears engaging the ends of said column members, said bearing flange and supporting base being secured together in a unitary assembly,
   said end plate portion having end portions extending laterally from its centrally disposed portion and secured in engagement with the adjacent ends of said column portions, said plate end portions and said bearing flange ears having openings aligned with said hollow column portions to permit the extension of fastening means therethrough.